No. 714,127. Patented Nov. 25, 1902.
C. W. ATKINSON.
ELECTRICAL MEASURING INSTRUMENT.
(Application filed May 23, 1902.)
(No Model.) 2 Sheets—Sheet 1.
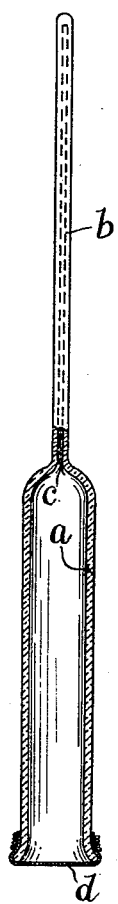
FIG. 1.
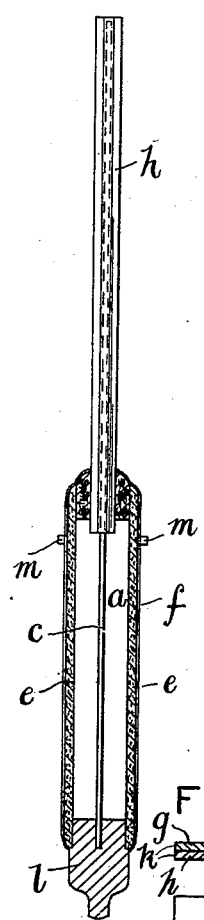
FIG. 2.
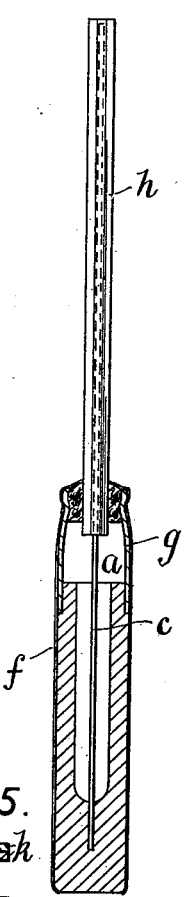
FIG. 3.
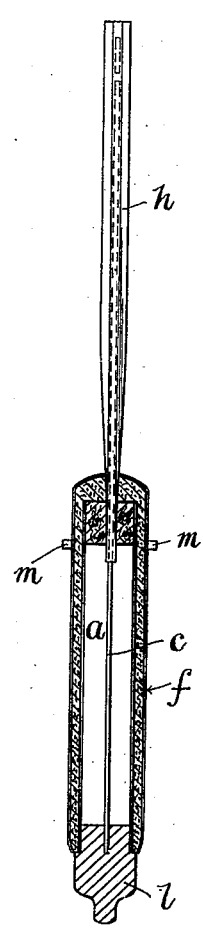
FIG. 4.
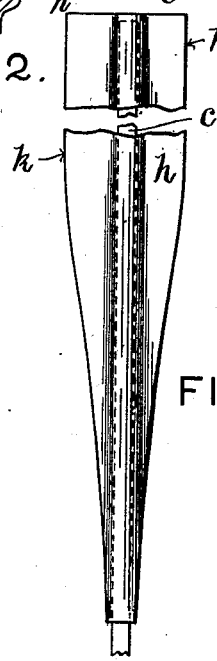
FIG. 5.
FIG. 6.
WITNESSES
INVENTOR.
Claude William Atkinson
By
ATTORNEYS No. 714,127. Patented Nov. 25, 1902.
C. W. ATKINSON.
ELECTRICAL MEASURING INSTRUMENT.
(Application filed May 23, 1902.)

(No Model.) 2 Sheets—Sheet 2.

WITNESSES:

INVENTOR
Claude William Atkinson
BY
ATTORNEYS.

UNITED STATES PATENT OFFICE.

CLAUDE WILLIAM ATKINSON, OF CARDIFF, ENGLAND.

ELECTRICAL MEASURING INSTRUMENT.

SPECIFICATION forming part of Letters Patent No. 714,127, dated November 25, 1902.

Application filed May 23, 1902. Serial No. 108,674. (No model.)

*To all whom it may concern:*

Be it known that I, CLAUDE WILLIAM ATKINSON, a subject of the King of Great Britain and Ireland, residing at Cardiff, in the county of Glamorgan, England, have invented a new and useful Improvement in Electrical Measuring Instruments, (for which I have made application for Letters Patent in Great Britain under No. 8,503, dated April 11, 1902,) of which the following is a specification.

This invention relates to electrical measuring instruments of a known principle for the measurement of electromotive force, current, and power, in which a floating body in sensitive and static equilibrium in a liquid is attracted and moved by the electric current to be measured, traversing a coil or coils surrounding or partly surrounding the said floating body; and it consists in improvements in the methods of automatic compensation for correction of the readings caused by variation of external temperature.

The use in electrical measuring instruments of a floating body carrying an iron or steel wire which is attracted by a solenoid carrying the current to be measured is not novel and has been previously used. These instruments did not, however, prove commercially practicable, owing to the fact that the density of the fluid in which the floating body was suspended varied with changes of temperature, and the floating body being made of glass or other material which expanded much less than the fluid with rise of temperature the float sunk to a lower level as the temperature rose, and thus the position of the zero of the instrument was varied and required constant adjustment by hand, the amount of which could not be determined while the instrument was in use. To show the importance of this source of error, I may give the following figures: In the case of a float having a displacement of twenty-five cubic centimeters and a stem having an area of 0.13 square centimeters floating in water the float would sink about half a millimeter for each degree centigrade rise of temperature, or with a variation of temperature of 60° Fahrenheit, such as is met with in most climates, there would be a variation of nearly seven-tenths of an inch in the position of the zero. If, as is already known, instead of using water as the fluid, paraffin-oil be used, then the variation is increased (owing to the greater expansibility of the oil over water) to nearly four times this amount, or about two and three-fourths inches, while even if sufficient glycerin be added to the water to prevent its freezing under normal circumstances the variation of the position of the zero would amount to very nearly an inch for a variation of 60° Fahrenheit in temperature. These variations in level of the float may be reduced by increasing the relative size of the stem; but in instruments of the type referred to the magnetic forces obtainable commercially are comparatively small, and therefore it is not practicable to make the stems large, and in addition unless the stems be kept small the accuracy of the readings is much impaired, both owing to the change in the weight of fluid displaced by the stem and the increase of other sources of error inherent in the arrangement. Automatic means for guarding against this source of error were introduced by L. B. Atkinson and described in the specification of Letters Patent in the United States of America No. 665,667, dated January 8, 1901. Means are there provided for producing a fluid having a variation of density with variation of temperature equal to the variation of density of the glass float. This method is a great advance, but has the objection that the adjustment of the density of the fluid by the deposition or solution of crystals of the compensating salt is slow, and in such cases as it is necessary to make the float nearly the same size as the containing-tube the diffusion of the salt is imperfect if the float is at rest, or nearly so. Now my invention consists in means for overcoming these several difficulties, and I provide means for making the variations in the density of the floating body equal to the variations in the density of the fluid. Within the limits of temperature usually met with the coefficients of cubical expansion of fluids may be taken to vary from .00025 for 1° centigrade for water to .001 for petroleum or .0013 for chloroform, the coefficients being rarely constant and these figures being means between about 5° centigrade and 50° centigrade. An almost continuous series of fluids can be obtained commercially between these limits either by taking fluids in a pure state or by mixing two or more fluids, as water and sulfuric acid in varying quantities, or by dissolving definite quantities of salts in water. Now with the exception of ebonite and sulfur, which having mean coefficients of cubic expansion of .00024 and .00017 per 1° centigrade have coefficients only slightly less than that of water, which I will call "Class A," materials may be divided into two other classes—"B," those having a coefficient much less than liquids, as glass, (about one-tenth or less that of water,) metals, and woods varying individually, but being mostly only relatively little more expansible than glass; "C," those having coefficients of expansion much greater than liquids, as gases, (almost fifteen times as great as water,) waxes, as stearin, paraffin-wax, beeswax, (having coefficients from three to five times as great as water,) and celluloid.

According to my invention I use a float made of a material that has practically the same coefficient of expansion as the fluid in which it floats, or I use or combine one or more bodies having a smaller coefficient of expansion than the fluid with one or more bodies having a greater expansion, and so produce a float which has a total or mean coefficient of expansion equal to that of the fluid. Thus I select air or other suitable permanent gas, and I inclose such a volume of this in a float of glass or other material of Class B by means of an elastic membrane, as india-rubber, that the expansion of this volume of air is sufficient to increase the total volume of the float by the desired amount, or I take a porous elastic material, like cork, and imprison air in it by means of a waterproof coating of elastic varnish or paint, and I sometimes make this cork body hollow, so that it only has thin elastic walls, and by this means I make a float which expands the same amount as the fluid it displaces. I may make floats having the body divided into two parts—one part made of celluloid or a hollow celluloid cylinder and the other part made of wood (which expands much less than water)—the volumes of the two parts being so proportioned that the total variation in volume is equal to that of the fluid displaced. When I use waxes as the compensating material, I form either an elastic body of cork, which I impregnate with wax, or I form a hollow elastic body of cork, which I impregnate with wax, or I mold a body, either solid or hollow, out of granulated cork or other suitable material and wax, the wax completely filling up the spaces between the portions of granulated material, and thus by proportioning the relative quantities of wax and cork or other material I produce a float having a correct mean coefficient of expansion. To these various types of bodies I attach stems, which I may make of tube, of glass, metal, celluloid, or other material, for containing the iron or steel wire, or I form the stem of two pieces of celluloid cemented together, so as to inclose the iron or steel wire, or I cement or secure ebonite onto the iron or steel wire, and so make a stem having the desired area. When I use stems of ebonite or celluloid, I sometimes shape these so that the area is different at different parts of the stem, so as to control the motion under varying forces and cause the scale of the instrument to be more or less open at different parts of the stroke.

In order that the invention may be the better understood, I will now proceed to describe the construction of the various types of float hereinbefore referred to in relation to the accompanying drawings, reference being had to the letters marked thereon.

Like letters refer to like parts in the various figures.

Figures 1, 2, 3, and 4 show various constructions of float according to my invention. Figs. 5 and 6 show enlarged detail views of the construction of the stem of the float. Fig. 7 shows the float arranged in a receptacle, as an electrometer.

Fig. 1 represents a float having a hollow glass bulb $a$ and stem $b$ with a magnetic core or wire $c$, the lower end of the bulb being closed by an elastic diaphragm $d$, of india-rubber or the like.

Fig. 2 shows a float in which the bulb $a$ is composed of cork walls $e$ and an inclosing coating $f$, of elastic varnish or paint, so that the gas is imprisoned in the bulb. If desirable, the body may be made completely of cork without a hollow space in its interior.

Fig. 3 shows a float in which the bulb $a$ is composed of an upper chamber $g$, of celluloid, and a lower portion, of wood, the whole bulb being coated with an elastic inclosing coat $f$, of varnish or paint.

Fig. 4 shows a float having its bulb $a$ formed of granulated cork and wax molded in a suitable mold and having an elastic inclosing coating $f$.

Fig. 5 shows an enlarged sectional view of the stem of the float made of two strips of celluloid $g$ $h$, cemented together, so as to inclose the iron or steel wire $c$.

Fig. 6 shows a front view of the same.

Figure 7:
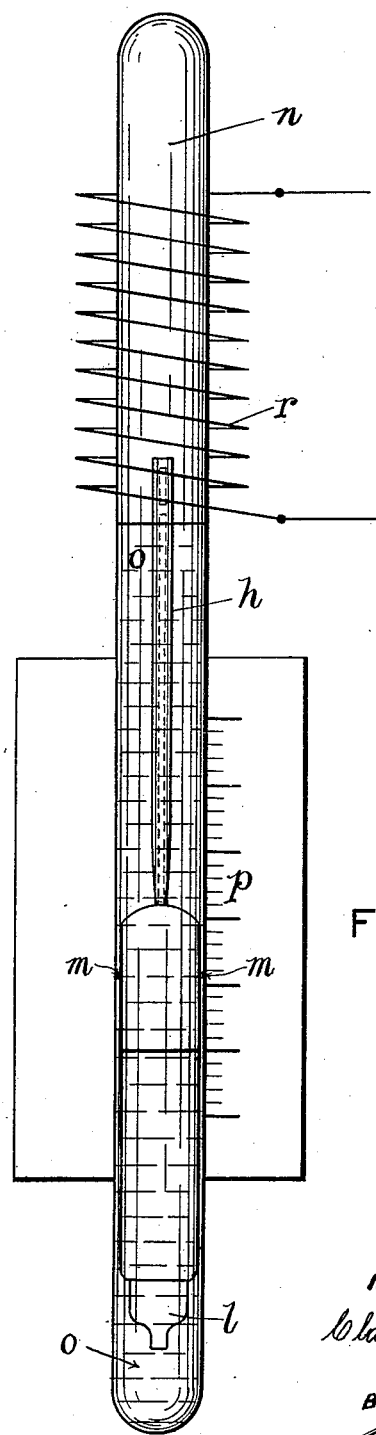

This form of construction of stem is very simple and cheap to carry out, and by having the lateral fins or ribs $k$ permits the transverse section of the stem to be varied with great facility by cutting away the ribs $k$ to a taper or other form, as shown in Figs. 4 and 6, so that the scale of the instrument can be opened out or closed up at any part in the range of the index.

If the float of the instrument is made of any material included in Class A—for example, ebonite—it is made in the usual manner.

The floats shown in Figs. 2 and 4 are provided with a weight $l$ to produce stability and points $m$ to keep the bulb $a$ out of contact with the sides of the vessel in which they are placed.

Fig. 7 shows a view of one of the floats made according to my invention adapted to float in a liquid $O$, contained in a receptacle $n$. Around the receptacle $n$ is disposed a coil $r$, through which the current to be measured passes, the indication being taken by the position of the float relative to a scale $p$.

Having now described my invention, what I claim, and desire to secure by Letters Patent, is—

1. In an electrical measuring instrument, a float constructed as a whole that its coefficient of expansion under heat is equal to the coefficient of expansion of the liquid in which the float is supported, in combination with a receptacle for containing the said liquid, substantially as described.

2. In an electrical measuring instrument, a float comprising bodies having greater and less coefficients of expansion, so that the mean coefficient of expansion of the float, as a whole, is equal to the coefficient of expansion of the liquid in which the float is supported, in combination with a receptacle for containing the said liquid, substantially as described.

3. In an electrical measuring instrument, a float having a bulb composed of cork and wax in such proportions that the mean coefficient of expansion of the float as a whole is equal to the coefficient of expansion of the liquid in which the float is supported, in combination with a receptacle for containing the said liquid, substantially as described.

4. In an electrical measuring instrument, a float having a coefficient of expansion under heat equal to the coefficient of expansion of the liquid in which the float is supported, having a stem composed of two strips of flexible material cemented together with a magnetic core between them, substantially as described.

In witness whereof I have hereunto set my hand in presence of two witnesses.

CLAUDE WILLIAM ATKINSON.

Witnesses:
REGINALD WILLIAM JAMES,
CHARLES CARTER.